United States Patent
Hans et al.

(10) Patent No.: US 9,453,143 B2
(45) Date of Patent: Sep. 27, 2016

(54) USE OF MODIFIED POLYSILOXANES IN COATING MATERIAL COMPOSITIONS AND MOLDING MATERIALS

(71) Applicant: BYK-Chemie GmbH, Wesel (DE)

(72) Inventors: Marc Hans, Wesel (DE); Wojciech Jaunky, Wesel (DE); Petra Della Valentina, Dinslaken (DE); Jüergen Hartmann, Oberhausen (DE); Verena Wintermeyer, Krefeld (DE)

(73) Assignee: BYK-Chemie GmbH, Wesel (DE)

( * ) Notice: Subject to any disclaimer, the term of this patent is extended or adjusted under 35 U.S.C. 154(b) by 0 days.

(21) Appl. No.: 13/261,892

(22) PCT Filed: Nov. 14, 2012

(86) PCT No.: PCT/EP2012/072639
§ 371 (c)(1),
(2) Date: May 14, 2014

(87) PCT Pub. No.: WO2013/072378
PCT Pub. Date: May 23, 2013

(65) Prior Publication Data
US 2014/0296417 A1    Oct. 2, 2014

(30) Foreign Application Priority Data
Nov. 14, 2011   (EP) ..................... 11189026

(51) Int. Cl.
C09D 183/10    (2006.01)
C09D 183/14    (2006.01)
C08G 77/54    (2006.01)
C08G 77/452    (2006.01)

(52) U.S. Cl.
CPC ........... *C09D 183/14* (2013.01); *C08G 77/452* (2013.01); *C08G 77/54* (2013.01); *C09D 183/10* (2013.01)

(58) Field of Classification Search
None
See application file for complete search history.

(56) References Cited

U.S. PATENT DOCUMENTS

| 4,613,641 A | 9/1986 | Haubennestel et al. |
| 4,659,777 A * | 4/1987 | Riffle et al. .................. 525/100 |
| 4,812,518 A | 3/1989 | Haubennestel et al. |

(Continued)

FOREIGN PATENT DOCUMENTS

| EP | 0249416 A2 | 12/1987 |
| EP | 0290109 A2 | 11/1988 |

(Continued)

OTHER PUBLICATIONS

Chujo et al. (Kobunshi Ronbunshu, (1992), 49(11), 943-946, English Translation.*

(Continued)

*Primary Examiner* — Satya Sastri
(74) *Attorney, Agent, or Firm* — Schwegman Lundberg & Woessner, P.A.

(57) ABSTRACT

The present invention relates to the use of modified polysiloxanes in thermally curing coating material compositions and molding materials, and to thermally curing coating material compositions and molding materials comprising modified polysiloxanes. The present invention also relates to coatings on a substrate, and to moldings which have been produced with such a coating material composition or molding material.

7 Claims, 1 Drawing Sheet

(56) References Cited

U.S. PATENT DOCUMENTS

| | | |
|---|---|---|
| 4,883,836 A | 11/1989 | Thill |
| 5,767,219 A * | 6/1998 | Takarada et al. ............... 528/29 |
| 5,807,944 A * | 9/1998 | Hirt et al. ..................... 526/279 |
| 6,444,776 B1 * | 9/2002 | Holland et al. ................. 528/26 |
| 7,504,469 B2 | 3/2009 | Haubennestel et al. |
| 2006/0079624 A1 * | 4/2006 | Nava et al. ................... 524/492 |

FOREIGN PATENT DOCUMENTS

| | | |
|---|---|---|
| EP | 0175092 B1 | 10/1990 |
| EP | 0217364 B1 | 1/1993 |
| EP | 0640643 A2 | 3/1995 |
| EP | 0756859 A1 | 2/1997 |
| JP | 63-258929 A | 10/1988 |
| JP | 01-98652 A | 4/1989 |
| JP | 02-294925 A | 12/1990 |
| JP | 2001-072767 A | 3/2001 |
| JP | 2001-0114932 A | 4/2001 |
| JP | 2001114932 A * | 4/2001 |
| WO | WO-2013072378 A1 | 5/2013 |

OTHER PUBLICATIONS

JP 2001114932 A, Apr. 2001, Derwent Ab.*

"International Application Serial No. PCT/EP2012/072639, International Preliminary Report on Patentability mailed Jun. 12, 2014", w/English translation, 12 pgs.

"International Application Serial No. PCT/EP2012/072639, International Search Report mailed Feb. 28, 2013", w/English translation, 5 pgs.

Chujo, Yoshiki, et al., "Synthesis of Polyoxazoline-Polysiloxane Block Copolymers", Kobunshi Ronbunshu, 49(11), w/English abstract, [online]. Retrieved from the Internet: <URL: https://www.jstage.jst.go.jp/article/koron1974/49/11/49_11_943/_pdf>, (1992), 943-946.

"Japanese Application Serial No. S011868PJP, Office Action mailed Oct. 20, 2015", in English, 14 pgs.

"Japanese Application Serial No. S011868PJP, Office Action mailed Nov. 11, 2015", in English, 4 pgs.

"Japanese Application Serial No. S011868PJP, Office Action mailed Jul. 7, 2015", w/ English Translation, 7 pgs.

"Japanese Application Serial No. S011868PJP, Office Action mailed Aug. 17, 2015", in English, 7 pgs.

* cited by examiner

USE OF MODIFIED POLYSILOXANES IN COATING MATERIAL COMPOSITIONS AND MOLDING MATERIALS

PRIORITY APPLICATIONS

This application is a U.S. National Stage Filing under 35 U.S.C. 371 from International Application No. PCT/EP2012/072639, filed on 14 Nov. 2012, and published as WO 2013/072378 A1 on 23 May 2013, which claims the benefit under 35 U.S.C. 119 to European Application No. 11189026.5, filed on 14 Nov. 2011; which applications and publication are incorporated herein by reference in their entirety.

FIELD OF THE INVENTION

The present invention relates to the use of polysiloxane-polyoxazoline copolymers as additives in coating material compositions such as paints and varnishes, and also in molding compounds. The present invention further relates to coating material compositions and molding compounds which comprise polysiloxane-polyoxazoline copolymers. The present invention also relates to coatings, and paint and varnish coats, and also moldings, which have been produced with the coating material compositions and molding compounds comprising polysiloxane-polyoxazoline copolymers.

BACKGROUND

In the coatings industry, differently modified polysiloxanes have long been used as additives in coating material compositions such as paints and varnishes, and also in molding compounds. In general these are polymers which possess a polysiloxane backbone grafted for example with polyester and/or polyether (side) chains. Also used, for example, are linear block copolymers, which as well as polysiloxane blocks also include polyether and/or polyester blocks. As a result of these modifications, various advantageous performance properties are generated, and/or compatibility is achieved between the additive in question and the corresponding coating material compositions or molding compounds. The polyether-modified and/or polyester-modified polysiloxanes are, in general, surface-active additives, in other words additives which can—often through a controlled accumulation at the surface of the respective coating—lead to particular advantageous surface properties. Examples of such properties include effective flow of the coating material compositions. Examples of properties of the coatings or finishes produced from the coating material compositions, or of the corresponding moldings, include a high scratch resistance or else a low slip resistance and good antistick properties in the case of soiling (in other words, effective dirt repellence) in conjunction with effective recoatability. Especially advantageous, accordingly, is the attainment of a balance between low slip resistance and/or effective dirt repellence, on the one hand, and effective recoatability, on the other. A balance of this kind is of great importance, for example, if already coated substrates or moldings are to be temporarily stored, in order then to be subsequently available directly for direct further processing or further coating. One of the reasons why this balance is important is in order, in particular, to be able to repair, for example, a dirt-repellent finish as described above, more particularly a topcoat finish, in the event of damage, without experiencing adhesion problems—in other words, to be able to repaint damaged and possibly abraded areas without problems of adhesion. Such damage may occur locally as a result of direct mechanical exposure of a painted surface. The damage may of course also come about as part of continuous wear in everyday use or everyday exposure, in which case a complete renewal or recoating of the original coatings is usually required. In this latter case specifically, the described balance is very important.

A problem and a disadvantage is that the modified polysiloxane additives known for use in coating material compositions and molding compounds usually have an unsatisfactory stability and/or exhibit migration behavior. Under the influence of thermal energy or heat, in particular, the polyether-modified and/or polyester-modified polysiloxanes do not have satisfactory stability, and may degrade. This is especially true of the polyether-modified polysiloxanes. The reaction products formed on such degradation, especially the resultant silicone oils, are in general incompatible or poorly miscible with the other constituents of the coating material composition or molding compound or of the polymeric matrix of the existing coating or existing molding, and in that case exhibit uncontrolled migration to the surface of the coatings or the molding. The usual outcome manifested is that of surface defects such as craters and popping marks, for example (see, for example, Steven J. Hinder et al., "Migration and segregation phenomena of a silicone additive in a multilayer coating", Progress in Organic Coatings, 54 (2005) 104-112). Another problem arises, moreover, in terms of the recoatability of the coating produced. As a result of the uncontrolled accumulation on the surface, appropriate recoatability and intercoat adhesion no longer apply. This effect is specially relevant for thermally curing coating material compositions and molding compounds, especially for thermally curing coating material compositions and molding compounds which are cured at high temperatures. This effect is likewise relevant, for example, for coatings which after having been produced, have been exposed to correspondingly high temperatures in the course of their applications. Examples include certain powder coatings, coil coatings, can coatings, or enamels for electrical insulation.

Despite the fact that the polyester-modified polysiloxanes of the kind described, for example, in EP 0175 092 B1, EP 0217 364 B1, and U.S. Pat. No. 7,504,469 offer advantages over the polyether-modified copolymers in terms of thermal stability, the thermal stability continues to be inadequate and to be in need of further improvement. An additional factor is that the modified siloxanes described, in other words the polyether-modified polysiloxanes and in particular the polyester-modified polysiloxanes as well, may exhibit a tendency toward migration even without the explicit influence of high temperatures on the coating material compositions and/or on the finishes produced from them. This means in particular that, over time, the additive may accumulate continuously at the surface of an existing coating film, or may even emerge from the surface of the coat. This effect may be exacerbated, of course, in coatings exposed to particular temperature fluctuations and/or to temperatures temporarily increased again and again, examples being automobile finishes (such as the finishes in the area of the hood, which are exposed to the heat of the engine).

The effects described are also highly relevant, in particular, in the context of the coil coating process, in which the coated strip is rolled up again and stored. Because of the internal pressure in the roll, acting on the coating, the migration behavior is exacerbated again. The same also applies in respect of painted substrates which, while having not been coated by the coil coating process, are nevertheless stored in stacked form, for example, and hence likewise subject to a high pressure. As a result of the migration, damage may possibly arise in the finish and there may also be adhesion problems, with respect to the intercoat adhesion, for example. Moreover, the emergence of the additive from the surface can lead to deposition of the additive on the reverse of the coated and rolled-up strip, and this can lead to defects and adhesion problems in the event of subsequent coating of the reverse of said strip. In any case, therefore, the longevity of the additives and hence of the advantageous effects they produce is inadequate and therefore deserving of improvement. Equally deserving of improvement is the migration behavior, described as emergence of the additive. Continuous migration additionally plays an important part in the case of coatings for substrates which are used in the food industry, for example, as containers or packaging. For instance, the migration and the emergence of the polymers from the varnish film may prove to be highly deleterious in the context of internal can coating for preserves.

As further modified polysiloxane block copolymers, polysiloxane-polyoxazoline copolymers, for example, are known. As well as polysiloxane blocks they also comprise polyoxazoline blocks, these being blocks prepared by polymerization of oxazolines (dihydrooxazoles), more particularly 2-oxazolines (4,5-dihydrooxazoles). EP 0 756 859 A1, EP 0 640 643 A2, and also U.S. Pat. No. 4,659,777 describe the use of such block polymers in haircare and cosmetics products or else in textiles, or in certain textile fibers.

U.S. Pat. No. 4,659,777 A also discloses the use of the additives described therein in compositions which are not thermally curing. Taught in particular is their use in thermoplastic and hence not thermally curing compositions such as polyvinyl chloride (PVC). In column 5 lines 17 ff., of U.S. Pat. No. 4,659,777 A, it is noted that the block copolymers described therein, when blended with other polymeric materials, pass by migration to the surface of the material in question. In this case there is a reorientation of the block copolymers at the surface, leading to a lowering of the contact angle for polar liquids and hence to relatively hydrophilic surfaces. Migration and reorientation are therefore essential to the effects addressed in U.S. Pat. No. 4,659,777 A. In thermally curing and hence crosslinked systems, however, such migration and reorientation of polysiloxane-polyoxazoline copolymers is very largely prevented, and so the effects described as essential in U.S. Pat. No. 4,659,777 A cannot be transposed to thermally curing systems.

DESCRIPTION OF THE INVENTION

Figure 1:
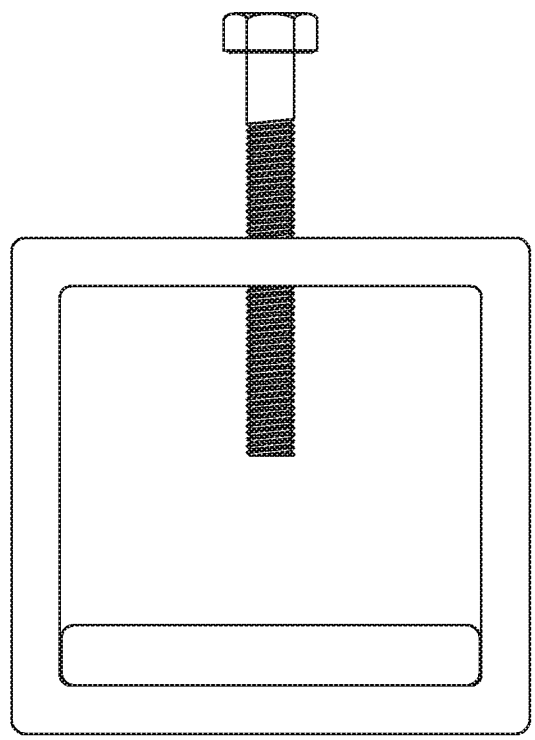
FIG. 1 is a photograph of a block tester.

The problem addressed by the present invention was that of providing thermally curing coating material compositions and molding compounds, more particularly coating material compositions, and coatings and moldings produced from them, which possess various advantageous performance properties such as effective flow, high scratch resistance, and very low slip resistance. The intention more particularly was to obtain outstanding antistick properties in the context of soiling, on the one hand, and effective recoatability on the other. The focus, then, was on an even and optimum balance between the two latter properties. A balance of this kind is important especially for topcoat finishes, which in the case of damage as described above, require local or complete renewal or recoating. The advantageous performance properties ought, moreover, to be retained for a long time. In particular, the intention was to prevent the stated advantageous properties significantly subsiding by migration and/or degradation of additives able to bring about these properties, or to prevent deleterious downstream effects, for example surface defects, coming about as a result of the migration of the additives and/or their decomposition products. A particular problem addressed with the present invention was that of producing an improvement in thermally curing coating material compositions and moldings which comprise common polyester-modified polysiloxanes as additives. Particularly for thermally curing coating material compositions and molding compounds which are cured with application of relatively high temperatures, or else, for example, coatings produced from them and exposed to certain temperature fluctuations and/or regularly elevated temperatures, the intention was to retain a highly advantageous long-term effect of the stated properties.

In the context of the present invention it has been found that the problems formulated above could be solved by the use of polysiloxane-polyoxazoline copolymers as additives in thermally curing coating material compositions and molding compounds.

The present invention accordingly provides for the use of polysiloxane-polyoxazoline copolymers as additives in thermally curing coating material compositions and molding compounds.

The present invention further provides thermally curing coating material compositions and molding compounds comprising polysiloxane-polyoxazoline copolymers.

Additionally provided by the present invention are coatings which have been produced with the thermally curing coating material composition of the invention, comprising polysiloxane-polyoxazoline copolymers, on a substrate, and also corresponding moldings.

The use in accordance with the invention achieves various advantageous performance properties of thermally curing coating material compositions and molding compounds and/or of coatings and moldings produced from them, such as effective flow, high scratch resistance, very low slip resistance, and reduced emergence of the additive from the coating. In particular, a good balance is struck between outstanding antistick properties in the context of soiling, on the one hand, and effective recoatability, on the other. The effects, moreover, have an outstanding longevity which is significantly improved by comparison with the prior art. Deployment in thermally curing coating material compositions and molding compounds which cure or must be cured at high temperatures, and also in areas of application where fluctuating, temporarily elevated temperatures may act on a coating or a molding, as for example in the case of a painted automobile body, is therefore especially advantageous.

The polysiloxane-polyoxazoline copolymers for inventive use are block copolymers which comprise at least one polysiloxane block and at least one polyoxazoline block. They may, for example, be linear block copolymers or else branched block copolymers, in other words block copolymers to which onto one block another block has been laterally attached or grafted.

Polysiloxanes and corresponding polysiloxane blocks are known. In the context of the present invention, in particular, the polysiloxane blocks involved are blocks comprising units of the following structural formula (I):

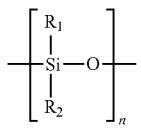
(I)

In this formula, n is 1 to 400, preferably 5 to 200, more preferably 5 to 100, and $R_1$ and $R_2$ independently of one another are saturated linear alkyl radicals having 1 to 6 carbon atoms, saturated branched alkyl radicals having 3 to 6 carbon atoms, saturated cyclic alkyl radicals having 4 to 6 carbon atoms, and/or linear alkenyl radicals having 2 to 6 carbon atoms, branched alkenyl radicals having 3 to 6 carbon atoms or cyclic alkenyl radicals having 4 to 6 carbon atoms, and/or aryl radicals, alkylaryl radicals and/or arylalkyl radicals having 6 to 12 carbon atoms, the radicals being optionally halogen-substituted, thus meaning that, optionally, some or all of the H atoms have been replaced by halogen atoms, more particularly fluorine. With preference, $R_1$ and $R_2$ independently of one another are a methyl, ethyl, propyl, butyl or fluorinated alkyl radical and/or a phenyl radical and/or a halogen-substituted and/or alkyl-substituted phenyl radical. Particularly preferred radicals $R_1$ and $R_2$ are methyl radicals.

Polyoxazolines are likewise known and comprise or are constructed from oxazoline monomers. Of primary interest, and hence also preferred in the context of the present invention, among the monomers used are 2-oxazolines, more particularly 2-oxazolines substituted in 2-position, of the general formula

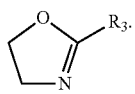
(A)

In this formula, $R_3$ stands for hydrogen, a saturated linear alkyl radical having 1 to 12 carbon atoms, a saturated branched alkyl radical having 3 to 12 carbon atoms, a linear or branched alkenyl radical having 3 to 12 carbon atoms, or an aryl radical having 6 to 10 carbon atoms, such as a phenyl, naphthyl, or benzyl radical, for example. With preference $R_3$ is a saturated linear alkyl radical having 1 to 6 carbon atoms, more preferably a methyl or ethyl radical, very preferably an ethyl radical.

Corresponding polymers can be prepared from the monomers described, in a conventional way, as for example using p-toluenesulfonic acid alkyl esters such as methyl p-toluenesulfonate, or allyl tosylate, as initiator, in a ring-opening polymerization (see, for example, Yoshiki Chujo et al., "Synthesis of polysiloxane-polyoxazoline graft copolymer by hydrosilylation reaction" Polymer Bulletin, 19 (1988) 435-440). The corresponding polymers, and accordingly the polyoxazoline blocks preferred in the context of the present invention, comprise units of the following structural formula (B):

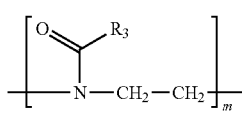
(B)

In this formula, m is 1 to 400, preferably 5 to 200, more preferably 5 to 100, and $R_3$, in each case independently of any other radicals $R_3$, stands for organic radicals $R_3$ as defined above.

Preferred polysiloxane-polyoxazoline copolymers comprise polysiloxane blocks which consist of the following structural formula (II):

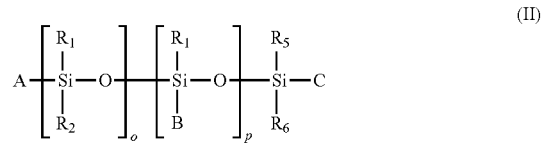
(II)

In this formula, o is 0 to 400, preferably 5 to 200, more preferably 5 to 100, p is 0 to 400, preferably 0 to 50, more preferably 0 to 10, and $R_1$ and $R_2$ independently of one another are organic radicals $R_1$ and $R_2$ as defined above. $R_5$ and $R_6$ independently of one another are $R_1$ or $R_2$ or are $R_4[SiR_1R_2O]_q$, in which q is 1 to 400, preferably 5 to 200, and $R_4$ is a saturated linear alkyl radical having 1 to 30 carbon atoms, a saturated branched alkyl radical having 3 to 30 carbon atoms, a saturated cyclic alkyl radical having 4 to 30 carbon atoms, and/or an aryl radical, an alkylaryl radical, and/or an arylalkyl radical having 6 to 30 carbon atoms, the radicals being optionally halogen-substituted. With preference $R_4$ is a methyl radical and/or a butyl radical.

A and C independently of one another are B or $R_4$.

B is a linear or branched alkyl or aralkyl radical or a linker having a linear or branched alkylene or aralkylene structure, which may comprise nitrogen and oxygen atoms, with the proviso that there is at least one such linker per siloxane block (II).

A linker for the purposes of the present invention is a structural unit which in contrast to a radical comprises a bond which is free, in relation to the formal linker structural unit, and which then permits connection to other structural units and hence, in the molecule, forms the link to another structural unit, more particularly to the polyoxazoline blocks described below.

The at least one linker per siloxane block corresponds preferably to the formula (III):

$(CH_2)_t$—$R_{10}$—$R_{11}$—$R_{12}$—$R_{13}$—  (III)

In this formula, t is 2 to 30, preferably 2 to 3, more preferably 3, $R_{10}$ is $(CH_2)_u$, O, S, $NR_{14}$, or $(C_6R_{15})_4$, where u is 0 or 1, $R_{14}$ is hydrogen or a saturated linear alkyl radical having 1 to 6 carbon atoms, a saturated branched alkyl radical having 3 to 6 carbon atoms, or an aryl radical, alkylaryl radical or arylalkyl radical having 6 to 9 carbon atoms, and $R_{15}$ is hydrogen and/or an alkyl radical having 1 to 6 carbon atoms.

$R_{11}$ is $(CH_2)_v$ or $(CH_2CHR_{16}O)_w$, where v is 0 to 30, preferably 0 to 3, more preferably 0 and w is 0 to 50, preferably 0 to 30, more preferably 0, and $R_{16}$ is hydrogen or a saturated linear alkyl radical having 1 to 6 carbon atoms, a saturated branched alkyl radical having 3 to 6 carbon atoms, or a saturated cyclic alkyl radical having 4 to 6 carbon atoms.

$R_{12}$ is $(CH_2)_x$, in which x is 0 to 3.

$R_{13}$ is $(CH_2)_y$, O, S, $NR_{14}$, in which y is 0 to 2 and $R_{14}$ stands for organic radicals $R_{14}$ as defined above, preferably hydrogen.

The linker is preferably an amino-functional linker $(CH_2)_t$—$R_{10}$—$R_{11}$—$R_{12}$—$NR_{14}$— and results from an amino-functional radical $(CH_2)_r$—$R_{10}$—$R_{11}$—$R_{12}$—$NHR_{14}$ attached to the siloxane framework. This amino-functional radical is preferably an amino-functional radical with a primary amino group, and more particularly is a 2-aminoethyl group, 3-aminopropyl group, 3-aminopropyl ethyl ether group, or 6-aminohexyl group, very preferably a 3-aminopropyl group. This therefore means in particular that for the preparation described later on below, of the polysiloxane-polyoxazoline copolymers for inventive use, polysiloxanes are employed which comprise at least one terminal amino group, the linkage to a polyoxazoline being produced via this amino group, and a polysiloxane-polyoxazoline copolymer then being formed that comprises a polysiloxane block comprising an amino-functional linker, and also a polyoxazoline block. The amino group or the amino-functional radical $(CH_2)_r$—$R_{10}$—$R_{11}$—$R_{12}$—$NHR_{14}$ may be introduced into the polysiloxane via techniques that are known per se. Examples include the addition of an unsaturated organic amine, more particularly allylamine, onto an Si—H-functional polysiloxane, this preferred addition being synonymous with the introduction of the linker $(CH_2)_3$—NH—.

The preferred amino-functional linker may also have been salified or quaternized. Modification of the amino groups takes place in accordance with the methods known to a person of ordinary skill in the art. The nitrogen atom of an amino group may be quaternized, for example, using alkyl or aralkyl halides, halocarboxylic esters, or epoxides.

In the context of the present invention, the amino-functional linkers lead to particularly preferred properties, and are therefore employed with preference. As a result of the above-described salification or quaternization, for example, the copolymers for inventive use can be adapted effectively to different media—that is, therefore, in particular, both to waterborne and to solventborne coating material compositions. Such salification or quaternization is in particular not possible with the nitrogen atoms in the polyoxazoline framework, since within an amide bond, these atoms are located in alpha-position to a carbonyl group, and are consequently not amenable to effective salification or quaternization, because of the corresponding mesomeric effects. Additionally advantageous is the effective and preparatively simple nucleophilic addition of the polysiloxanes to the below-described oxazolines or polyoxazolines, this addition being made possible by the amino group, more particularly by a primary amino group, and permitting a rapid, neat and high-yield preparation of the copolymers for inventive use.

The polysiloxane blocks may possess a linear or branched structure. They preferably possess a number-average molecular weight in the range from 200 to 30 000, more preferably in the range from 500 to 10 000, and more preferably still in the range from 500 to 5000 g/mol (measured by means of gel permeation chromatography (GPC) against polysiloxane standard, with the parent polysiloxane of the polysiloxane block being measured in each case prior to the reaction to form the copolymer).

Preferred polysiloxane-polyoxazoline copolymers comprise polyoxazoline blocks which consist of the following structural formula (C):

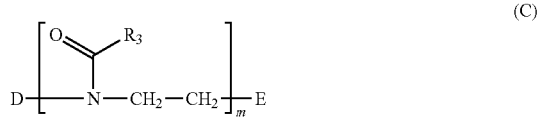

(C)

In this formula, m and $R_3$ are as defined above and D is a linker $(CH_2)_z$, in which z is 0 or 1, or a saturated linear alkyl radical having 1 to 30 carbon atoms, a saturated branched alkyl radical having 3 to 30 carbon atoms, a saturated cyclic alkyl radical having 4 to 30 carbon atoms, and/or an aryl radical, alkylaryl radical or arylalkyl radical having 6 to 30 carbon atoms. E either is likewise the linker $(CH_2)_z$, in which z is 0 or 1, or is an end group to which the adjacent $CH_2$ unit of the formula (C) is bonded via an O or N atom, and this O or N atom comes from an OH group of a water molecule, of an organic alcohol, or from an N—H unit of a primary or secondary amino group of an amine. The organic radical of the alcohol or the at least one organic radical of the amine may ultimately be selected arbitrarily, and in particular is a saturated linear alkyl radical having 1 to 30 carbon atoms, a saturated branched alkyl radical having 3 to 30 carbon atoms, a saturated cyclic alkyl radical having 4 to 30 carbon atoms, and/or an aryl radical, alkylaryl radical or arylalkyl radical having 6 to 30 carbon atoms.

Formula (C) is further subject to the proviso that at least one of the groups D and E is a linker as described above.

Preferably, E is a linker and D is a radical as described above.

Where, for example E is a linker $(CH_2)_z$ in which z is 0, E is therefore nonexistent, and the $CH_2$ unit of the formula (C) that is adjacent to the group E is bonded directly to another structural unit, as for example to a linker of the formula (III) as described above, more particularly to an amino-functional linker as described above.

This therefore means, in particular, that for the preparation of the polysiloxane-polyoxazoline copolymers for inventive use, this preparation being described later on below, a polyoxazoline is first of all prepared by known methods, with ring-opening polymerization, and is then reacted with a polysiloxane, as for example with a polysiloxane comprising at least one terminal amino group. Linking to the polysiloxane is then produced via the amino group, ultimately forming a polysiloxane-polyoxazoline copolymer which comprises a polyoxazoline block and also a polysiloxane block comprising an amino-functional linker.

The polyoxazoline blocks preferably possess a number-average molecular weight in the range from 200 to 30 000, more preferably in the range from 500 to 10 000, and more preferably still in the range from 500 to 5000 g/mol (measured by means of gel permeation chromatography (GPC) against polystyrene standard, with the parent polyoxazoline of the polyoxazoline block being measured in each case prior to the reaction to form the copolymer).

The polysiloxane-polyoxazoline copolymers can be prepared by various processes known to the skilled person.

The polysiloxane-polyoxazoline copolymers are preparable preferably by reaction of an amino-functional polysiloxane with a terminally reactive polyoxazoline, which can be prepared by ring-opening polymerization of oxazoline monomers.

A synthesis of this kind is as described in, for example, *Synthesis of polyoxazoline—polysiloxane block copolymers* (by Chujo, Yoshiki; Ihara, Eiji; Saegusa, Takeo; Fac. Eng., Kyoto Univ., Kyoto, Japan in Kobunshi Ronbunshu (1992), 49(11), 943-6).

For this reaction, preference is given to using the above-described polysiloxanes comprising at least one amino-functional radical and hence at least one terminal amino group. Preference is therefore given to using polysiloxanes having an amino-functional radical $(CH_2)_r$—$R_{10}$—$R_{11}$—$R_{12}$—$NHR_{14}$. Particularly preferred amino-functional radicals are 2-aminoethyl groups, 3-aminopropyl groups, 3-aminopropyl ethyl ether groups and/or 6-aminohexyl groups, very preferably 3-aminopropyl groups. Preferred polysiloxanes are those having precisely one amino-functional radical.

For the ring-opening polymerization for preparing the terminally reactive polyoxazolines for use in the reaction, preference is given to using p-toluenesulfonic acid alkyl esters, more particularly methyl p-toluenesulfonate, as initiator. As is known, the terminally reactive polyoxazolines are polymers in which, after the ring-opening polymerization, the last-attached oxazoline monomer has not yet undergone ring opening. The still-closed ring of the last-attached oxazoline monomer therefore carries a positive formal charge, and is therefore reactive.

In the reaction, then, as in the case of the oxazoline polymerization that takes place beforehand, the activated carbon atom, located in beta-position to the nitrogen atom of the terminal oxazoline ring still present, is subjected to nucleophilic attack. This attack takes place by the at least one amino group of the amino-functional polysiloxane.

Polysiloxane-polyoxazoline copolymers which are preparable by the preferred reaction therefore consist in particular of the above-described preferred polysiloxane blocks and polyoxazoline blocks.

With very particular preference it consists of not more than three blocks, with preferably one polysiloxane block and two polyoxazoline blocks being present. In one particularly preferred embodiment, the polysiloxane-polyoxazoline copolymer consists of precisely two blocks, one polysiloxane block and one polyoxazoline block.

The polysiloxane-polyoxazoline copolymers preferably possess a number-average molecular weight in the range from 400 to 200 000, more preferably in the range from 1000 to 50 000, and more preferably still in the range from 1000 to 10 000 g/mol (measured by means of gel permeation chromatography (GPC) against polystyrene standard).

In the context of use in accordance with the invention, the polysiloxane-polyoxazoline copolymers are used preferably in a coating material composition or molding compound, more particularly in a coating material composition, with a fraction of 0.005 to 5 wt %, more preferably 0.01 to 2 wt %, more particularly of 0.01 to 1 wt %, very preferably of 0.01 to 0.95 wt %, based in each case on the overall composition. Here there is either only one polysiloxane-polyoxazoline copolymer, or a mixture of two or more different polysiloxane-polyoxazoline copolymers. Preferably precisely one copolymer is used.

Of very particular advantage is the fact, determined in the context of the present invention, that even very small amounts of polysiloxane-polyoxazoline copolymers lead to the advantageous properties described above, and hence, in addition to the advantage of only minimal use, other properties of a coating material composition or molding compound, and also of finishes and moldings produced from them, are not adversely affected. These include properties such as, for example, the corrosion control, the gloss retention, or the weathering resistance.

In the context of use in accordance with the invention, coating material compositions are used. Different thermally curing coating material compositions may be employed here. These coating material compositions may be self-crosslinking and/or externally crosslinking. Preferably they are externally crosslinking.

In the context of the present invention, "thermally curing" means the crosslinking of a paint or varnish coat (formation of a coating film) by chemical reaction of reactive functional groups, with the energetic activation of this chemical reaction being possible in particular through thermal energy. Thermal curing is therefore to be understood as chemically reactive curing, which may be activated by thermal energy. In this reaction, as is known, different functional groups which are complementary to one another can react with one another, and/or film formation derives from the reaction of autoreactive groups, these being functional groups which react with one another with groups of their own kind. In each case, then, the thermal curing is based on a chemical reaction between functional groups. Examples of suitable complementary reactive functional groups and autoreactive functional groups are known from, for example, German patent application DE 199 30 665 A1, page 7 line 28 to page 9 line 24.

This crosslinking may be a self-crosslinking and/or external crosslinking. Where, for example, the complementary reactive functional groups are already present in an organic polymer used as binder, as described below, the crosslinking is self-crosslinking. External crosslinking is present, for example, when an organic polymer as binder, comprising certain functional groups, reacts with another organic polymer as binder, comprising complementary functional groups. External crosslinking is likewise present when the organic polymer as binder reacts with an organic compound used as crosslinking agent, as described later on below, in which case the crosslinking agent comprises reactive functional groups which are complementary to the reactive functional groups present in the organic polymer employed.

It is also possible for an organic polymer as binder to have not only self-crosslinking but also externally crosslinking functional groups, and to be then combined with crosslinking agents.

Different thermally curing coating material compositions and their constituents are described in, for example, "Lackrohstoff-Tabellen, E. Karsten/O. Lückert, Vincentz 2000 ISBN 3878705611" and "Pigment- and Füllstoff-Tabellen, O. Lückert, Vincentz 2002 ISBN 9783878707448". Such coating material compositions comprise, for example, at least one typical organic polymer or polymeric, resin as binder, and also, optionally, at least one typical organic solvent and/or water, and also, optionally, other typical coatings additives. The way and the amounts in which such constituents of coating material compositions are to be selected are known to the person skilled in the art. Such a selection may be made by the skilled person, in each case, in accordance with the requirements of the particular case in hand, on the basis of his or her art knowledge.

As is known, organic polymers, in other words, for example, the polymers which can be used as binders or else the above-described polysiloxane-polyoxazoline copolymers, constitute mixtures of molecules with different sizes, these molecules being distinguished by a sequence of identical or different organic monomer units (as the reacted form of organic monomers). Whereas a particular organic monomer can be assigned a discrete molar mass, therefore, a polymer is always a mixture of molecules, which differ in their molar mass. A polymer can therefore not be described by a discrete molar mass, but is instead, as is known, always assigned average molar masses, these being a number-average ($M_n$) and a weight-average ($M_w$) molar mass.

The organic polymers to be used as binders are, for example, the conventional polyaddition resins, polycondensation resins and/or polymerization resins, which comprise the abovementioned functional groups for crosslinking, OH groups for example. Organic polymers known in this context and also possible for advantageous use in the context of the present invention are, for example, the conventional polyurethane, polyester, polyesterpolyol, acrylic (such as polyacrylate, polymethacrylate, and mixed poly(meth)acrylate), polyesteracrylate, epoxy, phenol/formaldehyde, poly(amide-imide) and/or alkyd resins. For further details, refer to Rompp-Lexikon Lacke and Druckfarben, Georg Thieme Verlag, Stuttgart, N.Y., 1998, pages 73-74.

Besides the above-stated organic polymers as binders, use is preferably further made of, for example, amino resins, and also of monomeric and/or polymeric, blocked and/or free polyisocyanates, more particularly blocked polyisocyanates, or else of hydroxyalkyl amides, as crosslinking agents for the thermal curing or external crosslinking.

In the context of use in accordance with the invention in coating material compositions, in particular, acrylic resins, epoxy resins, alkyd resins, phenol/formaldehyde resins, and polyester resins are used as binders, and are combined with melamine-formaldehyde resins as crosslinking agents. These thermally curing coating material compositions find application, for example, in the automobile industry and construction industry, for kitchen utensils, furniture, and the like. Likewise preferred for use as binders are poly(amide-imide) resins, which are used for the electrical insulation of cable coatings, for example. Additionally preferred are polyester resins, which are crosslinked with hydroxyalkyl amides (Primid system) and used in powder coatings, for example.

The total fraction of the organic polymers as binders and of the crosslinking agents optionally present, as a proportion of the thermally curing coating material compositions, is dependent on each individual case and may vary widely. In certain embodiments of the present invention, the fraction may be situated, for example, in the range from 10 to 90 wt %, preferably from 15 to 80 wt %, particularly advantageously between 25 and 60 wt %, based in each case on the total amount of the coating material composition. Also entirely possible, however, are lower or higher fractions, more particularly higher fractions, when, for example, the coating material composition is a powder coating material.

The thermally curing coating material composition optionally comprises an organic solvent. Organic solvents employed are the typical organic solvents known to the skilled person, examples being aliphatic, cycloaliphatic, and aromatic solvents, typical ethers, esters and/or ketones such as, for example, butylglycol, butyldiglycol, butyl acetate, methyl isobutyl ketone, methyl ethyl ketone, xylene, toluene, Shellsol A, Solvesso products. Water may likewise be employed. Thus, for example, the thermally curing coating material composition may be waterborne or solventborne. In the context of the present invention, waterborne means that the coating material composition comprises primarily water as solvent. More particularly, in the case of a waterborne coating material composition, there are not more than 20 wt %, more particularly not more than 10 wt %, of organic solvents present in the coating material composition, based on the total amount of solvents. A coating material composition is considered solventborne for the purposes of the present invention if it contains not more than 10 wt %, preferably not more than 5 wt %, especially preferably not more than 2 wt %, of water, based on the total amount of solvents. In comparison to the above-indicated fractions on which the waterborne or solventborne character is based, of course, the coating material composition may also include more balanced fractions and/or proportions of organic solvents and water.

The thermally curing coating material composition may also, for example, be a powder coating material. Powder coating materials are organic, usually thermosetting, coating powders having a solids fraction of 100%. Coating with powder coating materials does not necessitate solvents, as is known. Also possible is the use of powder coating slurries, these being aqueous suspensions of a powder coating material.

The fraction of solvent in the coating material composition may therefore be located for example in the range from 0 to 85 wt %, based on the total amount of the coating material composition.

The fact that, for example, solventborne, waterborne, and also solvent-free coating material compositions may be used is considered to be particularly advantageous. The polysiloxane-polyoxazoline copolymers have an outstanding compatibility with both polar and apolar media, and in both cases lead to the advantageous performance properties described above. The application scope is accordingly very great. This is true in particular of the copolymers comprising the above-described, amino-functional linkers, which may be salified or quaternized.

The thermally curing coating material composition for use in the context of the present use may, moreover, also comprise pigments or fillers. The selection of such pigments or fillers may be selected by the skilled person in accordance with the requirements of the individual case. For further details, refer, for example, to Römpp-Lexikon Lacke and Druckfarben (Georg Thieme Verlag, Stuttgart, N.Y., 1998, pages 250 to 252 and 451 to 453).

The thermally curing coating material composition for use in the context of the present use may also comprise different coatings additives. Such coatings additives are known to the skilled person and may be selected by him or her in accordance with the requirements of the individual case, on the basis of his or her art knowledge. Use may be made, for example, of photoinitiators, defoamers, wetting agents, film-forming assistants such as cellulose derivatives (cellulose nitrate and cellulose acetate, for example), other flow control agents, dispersants, and/or rheology control additives.

Particularly advantageous is the use of the polysiloxane-polyoxazoline copolymers as additives in hiding coating material compositions, more particularly in topcoats. These, as is known, are coating material compositions which are used to construct coatings which constitute the interface with the environment. In a multicoat paint system that is optionally present as well, therefore, these coatings are right at the outside, in other words on the side remote from the substrate. The above-described effects, particularly the dirt repellence, are obviously manifested particularly in this context.

Particularly advantageous, moreover, is the use of the polysiloxane-polyoxazoline copolymers as additives in coating material compositions which are utilized for substrates which are subsequently stacked one atop another. The above-described reduced migration (emergence of the additive from the coating) is manifested to particular advantage in this context.

Additionally provided by the present invention is a thermally curing coating material composition comprising polyoxazoline-polysiloxane copolymers. The embodiments and preferred embodiments described earlier on above in the context of the use in accordance with the invention, with regard to the polyoxazoline-polysiloxane copolymers to be used and to the coating material compositions, are equally applicable, correspondingly, to the coating material composition of the invention comprising polyoxazoline-polysiloxane copolymers. This also applies explicitly to the preferred embodiments specified in original claims 2 to 12.

The coating material composition of the invention is produced by way of the methods familiar to the skilled person, and has no peculiarities. The known methods are employed, such as the addition in steps, with stirring and mixing, of the constituents of the coating material composition, in customary and known mixing assemblies such as stirred tanks or dissolvers.

Likewise provided by the present invention is a coating on a substrate that has been produced with the coating material composition of the invention. Once again, the preferred embodiments already specified apply equally in respect of the coating of the invention.

The coating is produced by applying the coating material composition of the invention to a substrate and then curing the applied coating material composition.

The production of a coating as well takes place by way of the techniques of application to a substrate, and subsequent curing methods, that are familiar to the skilled person.

Application is accomplished for example, but not exclusively, by the known spraying, injecting, knife-coating, brushing, rolling, pouring, impregnating and/or dipping methods.

Application of the thermally curing coating material composition to a substrate is followed by the thermal curing in accordance with common methods. Curing may take place, for example, in forced-air driers or ovens, or via infrared radiation. The thermal cure may be practiced, for example, in the range from about 10° C. to about 400° C., depending on the nature of the coating material composition and/or of the substrate. The curing time, depending on each individual case, amounts for example to between 1 minute and a number of hours or even days, 10 days for example, but more particularly between 1 minute and 2 hours, preferably between 1 minute and 1 hour. In the context of the present invention, curing takes place preferably at temperatures of above 100° C., more particularly above 140° C., very preferably at above 180° C. The maximum curing temperature to be employed is likewise preferably at 400° C. This means, therefore, that the thermally curing coating material compositions are preferably compositions which are able to cure fully only at temperatures starting at above 100° C., more particularly above 140° C., very preferably at above 180° C., since only at and above these temperatures is effective chemical reaction possible, and hence crosslinking of the functional complementary and/or autoreactive groups. Generally speaking, as is known, the temperatures which prevail in the course of curing have an influence on whether a fully cured coating can be obtained. In this context, in particular, reference should be made to the thermal energy needed for the chemical reaction of complementary and/or autoreactive groups as described above. The advantageous effects of the present invention are manifested especially in the case precisely of such coating material compositions, since the polyoxazoline-polysiloxane copolymers are, surprisingly, substantially more thermally stable than the modified polysiloxane additives known from the prior art for thermally curable coating material compositions, and hence also do not migrate from the coating as it forms.

"Fully cured" denotes the state of a coating at which the service hardness throughout the coat has been achieved. Both laterally and vertically, therefore, the coat is in a state which is uniform in terms of chemically reactive crosslinking and hardness, and which also shows no further change as a result of further exposure to curing conditions, more particularly, therefore, by further exposure to temperatures of above 100° C., preferably above 140° C., very preferably above 180° C. The usefulness of the coating is therefore not improved any more, in particular, when it is exposed still further to the elevated temperatures described.

Depending on each individual case, curing may optionally be preceded by flashing, at 10 to 80° C., for example, for a time of 1 to 60 minutes. In the course of such flashing, parts of the solvent present already undergo evaporation, and in particular there is as yet no complete curing.

The dry film thicknesses are preferably 3 µm to 5 mm, more particularly 10 µm to 2 mm, more preferably 10 µm to 200 µm. Here as well, the conditions present in the particular case, and also the individual area of application, are factors.

Substrates which may be employed in the context of the present invention are any substrates for coating material compositions. The coatings of the invention are applied in particular to metal, glass, plastics, wood, leather, synthetic leather, ceramics, paper, and textiles, in various embodiments and forms. Particularly preferred substrates are those which have high heat resistance and in particular no longer change their shape, or, indeed, undergo decomposition, at temperatures of above 140° C. Particularly noteworthy, accordingly, are metal substrates.

The coating of the invention may be a single-coat coating or a multicoat coating. In the case of a multicoat coating, the coating material composition with which the individual coats of the coating of the invention are produced may be identical or different. It is essential to the invention, however, that at least one of the coating material compositions employed is a coating material composition of the invention, in other words comprising polyoxazoline-polysiloxane copolymers as additives. This at least one coating material composition is preferably the one which is used to produce the outer coat, in other words the topcoat.

In terms of the constituents, preparation, and possible applications, the comments applying to the thermally curing molding compounds and the moldings produced from them are the same as those stated above with regard to the coating material compositions and coatings. Molding compounds are understood to be materials which can be processed to form molded components or moldings, and the reactive resins contained in the compounds—in other words, in particular, binders and optionally crosslinking agents—are reacted in general at elevated temperature, after and/or during the shaping process, and are thereby thermally cured.

Molding compounds for the purposes of the invention are, for example, those based on unsaturated polyester resins and vinyl resins, including in combination with thermoplastics, such as polystyrene, polyvinyl acetate, polymethyl methacrylate, and styrene/butadiene copolymers, which are added, for example, as shrinkage-reducing components to the polyester resins. Other molding compounds comprise, in particular, polyurethanes and polyamides, which are employed, for example, in a reaction injection molding process and exhibit quite particular difficulties in terms of demoldability. Other molding compounds may also be those based on epoxy resins. These epoxy resins are used preferably in the field of casting compounds and compression-molding compounds. Other molding compounds, which may be processed by the wet compression process, injection process, or pultrusion process, for example, are phenol/formaldehyde condensation resins, also known by the term "phenolic resins".

These molding compounds may likewise comprise the additives customary in accordance with the prior art, or other constituents, of the kind already mentioned above in relation to the coating materials. In particular, such molding compounds may comprise fillers, examples being those referred to as reinforcing fillers. Noteworthy examples of fillers include glass fibers, carbon fibers and polyamide fibers, wollastonites, silicates, inorganic carbonates, aluminum hydroxide, barium sulfate, and kaolin.

As far as the amount of the added polysiloxane-polyoxazoline copolymers and the curing temperatures of the molding compounds are concerned, the same applies as in relation to the above-described coating material compositions.

The invention is described in more detail hereinafter, using examples.

EXAMPLES

Abbreviations, Trade Names pTsOMe=methyl p-toluenesulfonate
EtOxa=2-ethyl-2-oxazoline
MeOxa=2-methyl-2-oxazoline
eCL=epsilon-caprolactone
ESA=acetic anhydride
DBTL=dibutyltin dilaurate
PMI=polymolecularity index
AN=amine number
OHN=hydroxy number
Measurement Techniques:
NMR spectroscopy:

NMR measurements were carried out using an NMR instrument (Bruker DPX 300) at 300 MHz ($^1$H) or 75 MHz ($^{13}$C). Solvents used were deuterated chloroform and deuterated dimethyl sulfoxide.

Determination of Solids 2 g of sample are weighed out into an aluminum boat dried beforehand, the sample is dried in a drying cabinet at 150° C. for 10 minutes and cooled in a desiccator, and the cooled sample is then weighed again. The residue corresponds to the solids fraction.

Hydroxy Number

Alcoholic hydroxyl groups are reacted by acetylation with an excess of acetic anhydride. The excess acetic anhydride is then cleaved by addition of water to form acetic acid, which is back-titrated with ethanolic KOH. The hydroxy number is the amount of KOH in mg which is equivalent to the amount of acetic acid bound by 1 g of substance on acetylation.

Amine Number

Amine-containing substances are titrated with HCl. The amine number is the amount of KOH in mg which corresponds to the amine fraction of 1 g of substance.

Number-Average Molecular Weight ($M_n$)

The Mn was determined by means of GPC against a polysiloxane or polystyrene standard.

Example 1

Monoamino-Functional Polydimethylsiloxane

A four-neck flask equipped with stirrer, thermometer, dropping funnel, reflux condenser, and nitrogen inlet tube is charged with mono-SiH-functional polydimethylsiloxane (250 g, $M_n$≈2000 g/mol) and Karstedt catalyst (4.38 g, 0.2% dilution in xylene), and this initial charge is mixed thoroughly and heated to 100° C. Allylamine (9.29 g) is added dropwise over 30 minutes. The reaction of the mono-SiH-functional polydimethylsiloxane is monitored by means of gas volumetry. Following complete reaction, the excess allylamine is distilled off. The amine number measured for the product is 22.5 mg KOH/g.

Example 2

Monoamino-Functional Polydimethylsiloxane

A four-neck flask equipped with stirrer, thermometer, dropping funnel, reflux condenser, and nitrogen inlet tube is charged with mono-SiH-functional polydimethylsiloxane (1500 g, $M_n$≈5000 g/mol) and Karstedt catalyst (6.56 g, 0.8% dilution in xylene), and this initial charge is mixed thoroughly and heated to 100° C. Allylamine (39.8 g) is added dropwise over 30 minutes. The reaction of the mono-SiH-functional polydimethylsiloxane is monitored by means of gas volumetry. Following complete reaction, the excess allylamine is distilled off. The amine number measured for the product is 9 mg KOH/g.

Example 3

Alpha,Omega-Dihydroxy-Functional Polydimethylsiloxane

A four-neck flask equipped with stirrer, thermometer, dropping funnel, reflux condenser, and nitrogen inlet tube is charged with di-SiH-functional polydimethylsiloxane (400 g, $M_n$≈3000 g/mol) and Karstedt catalyst (1 g, 0.2% dilution in xylene), and this initial charge is heated to 55° C. Allylglycol (33.7 g) is metered in at a rate such that the temperature does not exceed 75° C. The reaction of the di-SiH-functional polydimethylsiloxane is monitored by means of gas volumetry. Following complete reaction, the excess allylglycol is distilled off. The hydroxy number measured for the product is 33.4 mg KOH/g.

Example 4

Monohydroxy-Functional Polydimethylsiloxane

A four-neck flask equipped with stirrer, thermometer, dropping funnel, reflux condenser, and nitrogen inlet tube is charged with mono-SiH-functional polysiloxane (300 g, $M_n$≈2000 g/mol) and Karstedt catalyst (0.75 g, 0.2% dilution in xylene), and this initial charge is heated to 55° C. Allylglycol (19.9 g) is metered in at a rate such that the temperature does not exceed 75° C. The reaction of the mono-SiH-functional polysiloxane is monitored by means of gas volumetry. Following complete reaction, the excess allylglycol is distilled off. The hydroxy number measured for the product is 23.9 mg KOH/g.

Example 5

Monohydroxy-Functional Polydimethylsiloxane

A four-neck flask equipped with stirrer, thermometer, dropping funnel, reflux condenser, and nitrogen inlet tube is charged with mono-SiH-functional polydimethylsiloxane (500 g, $M_n$ 5000 g/mol) and Karstedt catalyst (1 g, 0.2% dilution in xylene), and this initial charge is heated to 55° C. Allylglycol (13.1 g) is metered in at a rate such that the temperature does not exceed 75° C. The reaction of the mono-SiH-functional polydimethylsiloxane is monitored by means of gas volumetry. Following complete reaction, the excess allylglycol is distilled off. The hydroxy number measured for the product is 10.2 mg KOH/g.

General Synthesis Protocol for Polyoxazoline-Polysiloxane Copolymers

A four-neck flask equipped with dropping funnel, stirrer, thermometer, and condenser is charged with methyl p-toluenesulfonate, half of the oxazoline, and half of the solvent (see table 1). At 50° C., the other half of the oxazoline in the other half of the solvent is metered in. Following metered addition, the mixture is stirred at 75° C. until conversion of the monomer is quantitative. A check on the reaction is carried out by means of NMR. Subsequently an amino-functional polydimethylsiloxane is metered in slowly (see table 1). The mixture is stirred at 75° C. for two hours more. The solvent is distilled off.

In line with the general protocol, the following polyoxazoline-polysiloxane copolymers were prepared:

TABLE I (inventive examples 6 to 13)

| Example | pTsOMe | Oxazoline | Silicone | Solvent |
|---|---|---|---|---|
| Example 6 | 6.61 g | EtOxa 35.1 g | PDMS 3345[1] 50 g | Toluene 39 g |
| Example 7 | 6.61 g | EtOxa 75.8 g | PDMS 3345[1] 50 g | Toluene 54 g |
| Example 8 | 3.76 g | EtOxa 9.99 g | Example 1 50 g | Toluene 27 g |
| Example 9 | 3.76 g | EtOxa 20.0 g | Example 1 50 g | Acetonitrile 31 g |
| Example 10 | 3.76 g | EtOxa 40.0 g | Example 1 50 g | Acetonitrile 40 g |
| Example 11 | 1.15 g | EtOxa 12.2 g | Example 2 50 g | Acetonitrile 43 g |
| Example 12 | 6.61 g | MeOxa 35.1 g | PDMS 3345[1] 50 g | Toluene 39 g |
| Example 13 | 3.76 g | MeOxa 20.0 g | Example 1 50 g | Acetonitrile 32 g |

[1] PDMS 3345 = alpha,omega-diamino-functional poly-dimethylsiloxane from Wacker AN = 39

General Synthesis Protocol for Polyester-Modified Polydimethylsiloxanes

A hydroxy-functional polydimethylsiloxane, epsilon-caprolactone, and Shellsol A are weighed out into a four-neck flask equipped with dropping funnel, stirrer, thermometer, and condenser, and this initial charge is heated to 160° C. under a nitrogen atmosphere. Then 0.3 wt % (based on the overall batch) of a 10% strength solution of DBTL in xylene is added. The batch is stirred at 160° C. until all of the epsilon-caprolactone has reacted. The check on conversion was made by means of determination of solids. The batch is subsequently cooled to 90° C. and acetic anhydride is added. In addition, 0.05 wt % of 1-methylimidazole is added. The batch is stirred at 90° C. for 3 hours. The solvent and excess acetic anhydride are distilled off.

In line with the general protocol, the following polyester-modified polydimethylsiloxanes were prepared:

TABLE 2

(comparative examples 1 to 6)

| Example | Silicone | eCL | ESA | Shellsol A |
|---|---|---|---|---|
| Comparative example 1 | Example 3 100 g | 59.5 g | 9.11 g | 16 g |
| Comparative example 2 | Example 3 75 g | 89.3 g | 6.61 g | 33 g |
| Comparative example 3 | Example 4 200 g | 42.6 g | 15.34 g | — |
| Comparative example 4 | Example 4 130 g | 55.4 g | 8.48 g | 37 g |
| Comparative example 5 | Example 4 150 g | 127.8 g | 9.78 g | 9 g |
| Comparative example 6 | Example 5 50 g | 36.36 g | 3.3 g | 103 g |

Comparative Example 7

Polyether-Modified Polydimethylsiloxane

In a four-neck flask equipped with dropping funnel, stirrer, thermometer, and condenser, mono-SiH-functional polydimethylsiloxane (78 g), Dowanol PMA (200 g), toluene (25 g), and allyl polyether (allyl-(ethylene oxide(EO)/propylene oxide(PO))—OH with a EO:PO ratio of 1:1 and a number-average molecular weight of 4000 g/mol, 82.18 g) are weighed out and heated to 100° C. 2.32 g of 0.6% strength Speiers solution are added. The reaction of the mono-SiH-functional polysiloxane is monitored by means of gas volumetry. Following complete reaction, some of the solvent is distilled off, and, after cooling to 90° C. has taken place, acetic anhydride is added. In addition, 0.05 wt % of 1-methylimidazole is added. The batch is stirred at 90° C. for 5 hours. The solvent and excess acetic anhydride are distilled off.

Thermogravimetric Analysis

A thermogravimetric analysis (instrument: TGAQ5000 from TA) was carried out on examples 7 and 10, and also on comparative examples 2 and 5 (table 3). For this purpose, the sample was weighed out into an aluminum crucible and heated at a rate of 10 K/min from 30° C. to 400° C. in air. The residual amount of substance in wt % was determined subsequently.

TABLE 3

(thermogravimetric analysis)

| Number | Residual content [%] |
|---|---|
| Example 7 | 63.2 |
| Comparative example 2 | 50.9 |
| Example 10 | 59.43 |
| Comparative example 5 | 42.1 |

The results show that the copolymers of the invention exhibit a significantly better thermal stability than the polyester-modified polysiloxanes.

Investigation of Performance Properties

Using the polysiloxane copolymers prepared in accordance with the examples above, different coating material compositions were produced. Using these coating material compositions, coatings were produced on different substrates. Various properties of the coating material compositions and coatings were investigated. The coating material compositions and coatings investigated, their properties, and the associated analytical techniques are described below.

System 1: Migration Behavior

Composition of the coating material compositions, production of the coatings:

Gold Varnish Based on Phenodur PR285

Composition (figures in parts by weight):

| | |
|---|---|
| Phenodur PR 285/55% form | 15.0 |
| Epikote 1007 (50% in Dowanol PM) | 62.2 |
| Maprenal MF 800/55% form | 1.7 |
| Solvesso 150ND | 11.5 |
| Dowanol PM | 9.6 |

Phenodur PR 285/55% form = curable phenolic resin from Cytec
Epikote 1007 (50% in Dowanol PM) = epoxy resin based on bisphenol A, from Resolution Performance Products
Maprenal MF 800/55% form = isobutylated melamine-formaldehyde resin from INEOS Melamines, Inc.

Stamping Varnish Based on Uralac SN 852

Composition (figures in parts by weight):

| | |
|---|---|
| Uralac SN 852 (60% in Solvesso 150ND) | 17.1 |
| Disperbyk 110 | 0.9 |
| Kronos 2310 | 30.0 |
| Butyldiglycol acetate | 3.3 |
| Dissolver 15 min 5000 rpm, toothed disk 6 cm, 350 ml vessel | |
| Uralac SN 852 (60% in Solvesso 150ND) | 24.0 |
| Solvesso 150ND | 6.9 |
| Maprenal MF 980 (62% in butanol) | 6.0 |
| Epikote 834 (80% in SE 150D) | 10.3 |
| Butyldiglycol acetate | 1.5 |

Uralac SN 852 = acrylate resin based on 2-methoxy-1-methyl methacrylate, from DSM Coatings Resins
Maprenal MF 980 = benzoguanamine-formaldehyde resin, n-butyl-etherified, from INEOS Melamines GmbH
Epikote 834 = epoxy resin based on bisphenol A, from Hexion Specialty Chemicals B.V.
Kronos 2310 = titanium dioxide rutile from Kronos International
Disperbyk 110 = wetting and dispersing additive, solution of a copolymer with acidic groups, from Byk-Chemie GmbH The additives, 0.02% active substance based on total formulation, are first stirred by hand into the gold varnish. Mixing then takes place with a Skandex shaker for 10 minutes. One day after the mixing or shaking, the additized gold varnishes are drawn down with a 30 µm wire doctor onto a tinplate sheet (Krüppel El electrolytically plated tinplate). The varnishes are baked at 190° C. for 12 minutes.

Analytical Methods:

The flow is assessed visually. (1=good flow, 5=poor flow)

To determine the migration behavior, sheets coated with the additized gold varnish after having been cut to a size of 9.5 cm×9.5 cm are stacked on one another so that the coated side is in contact with the bare reverse of the sheet lying above it. The stack is clamped into a block tester (FIG. 1) and a load of 20 newtons is set using a torque wrench. The block tester with the clamped-in sheets is then placed in a 60° oven for 24 hours. Thereafter the sheets are removed from the block tester, and the stamping varnish is drawn down onto the bare side with a 35 µm wire doctor. The poorer the wetting of the latterly varnished side, the greater the amount of silicone that has migrated from the sheet stacked beneath it. Assessment was made visually (ratings 1-5, 1=no migration of the additive; 5=severe migration of the additive).

For the determination of the COF (slip resistance), the applied sheets are measured using the Altek 9505AER instrument. In this instrument, a 1 kg weight is drawn at a speed of 127 mm/min over the sheet. The value obtained is multiplied by a factor of 0.01 for the calculation of the COF. A low value, accordingly, corresponds to a low slip resistance.

The results obtained are set out in table 4.

TABLE 4

(performance properties)

| Additive in gold varnish | Flow | COF | Migration |
|---|---|---|---|
| Sample without additive | 1 | 0.53 | 1-2 |
| Example 6 | 1-2 | 0.28 | 1-2 |
| Example 8 | 1-2 | 0.11 | 2 |
| Example 9 | 1-2 | 0.15 | 2 |
| Example 10 | 1 | 0.12 | 1-2 |
| Comparative example 1 | 2 | 0.09 | 4 |
| Comparative example 3 | 1-2 | 0.12 | 5 |
| Comparative example 4 | 1-2 | 0.05 | 5 |
| Comparative example 5 | 1-2 | 0.07 | 4 |

The results show that using the copolymers for inventive use from examples 6, 8, 9, and 10 produces good flow, and, as in the case of the comparative systems with polyester modifications, a substantial reduction in the slip resistance is achieved. Moreover, the examples typifying the invention are notable for substantially less migration and hence for the assurance of better recoatability.

System 2: Easy-to-Clean/Intercoat Adhesion

Composition of the coating material compositions, production of the coatings:

Acrylate/Melamine Baking Varnish, Clear

Composition (figures in parts by weight):

| | |
|---|---|
| Setalux 1756 W-65, 65% form | 60 |
| Setamine US 138 BB-70, 70% form | 24 |
| Shellsol A | 8 |
| Xylene | 8 |

Setalux 1756 W-65, 65% form = acrylate baking resin, 65% in Shellsol A, Nuplex Resins, Bergen op Zoom
Setamine US 138 BB-70, 70% form = melamine baking resin, 70% in n-butanol, Nuplex Resins, Bergen op Zoom The additives, 0.05% active substance based on total formulation, are first of all stirred in by hand. This was followed by mixing with a Skandex shaker for 10 minutes. One day after the mixing or shaking, the additized varnishes are drawn down wet with a 150 µm four-way bar coater onto glass plates and primed steel sheets (ST 1405). After a flashing time of 30 minutes at 25° C., the sheets are baked at 140° C. for 25 minutes. For the testing of the intercoat adhesion, curing was carried out in a gradient oven in each case also at 170° C., 200° C., and 230° C.

Analytical Methods:

The surface tension measurement (OFS) was carried out using a tensiometer from Krüss by the ring method in accordance with DIN 53914.

The haze was assessed visually using the glass plates. 1=no haze, 5=very hazy

The slip, or the reduction in the slip resistance, was determined with the slip measuring instrument in accordance with the APM-001 performance testing method from BYK-Chemie GmbH. For this purpose, the coating material under test is applied to glass plates measuring 10×40 cm which have been cleaned in a dishwasher beforehand. The plate is clamped onto an applicator and positioned in such a way as to allow a 500 g weight to be placed centrally onto the coating. A space of 1-2 mm is to remain between weight and force transducer. The weight is pushed over the sample at a rate of 50 mm/sec. The measurements are carried out against a standard sample (blank sample, no additive), which is used as a reference for the evaluation.

For the evaluation, the reduction in slip in % is calculated. The slip reduction, reported in table 5 below, is calculated as follows:

$a = COF$ of standard $b = COF$ of sample $a$ $$\text{Reduction in slip resistance} = \frac{(a-b)*100\%}{a}$$

Edding Test:

The surface of the varnish is written on using an Edding 400 permanent marker, and a visual assessment is made of whether the surface is writable. The parameter assessed is whether the ink spreads on the surface or contracts. After the ink has dried, an attempt is made to wipe it off using a dry cloth.

Evaluation (Visual) According to Ratings 1-5:

1=ink contracts, can be removed without residue with a paper cloth

5=ink spreads very well on the substrate, is virtually impossible to remove

Mineral Oil Run Test:

A drop of commercial mineral oil is applied to the varnish surface. The coated varnish surface is then tipped until the drop has run approximately 10 cm. After 5 minutes have elapsed, an inspection was made to evaluate the oil track or drop reformation.

Evaluation (Visual) According to Ratings 1-5:

1=the oil track immediately reforms into individual drops

5=the oil track does not reform, but instead spreads possibly wider

The results obtained are set out in table 5.

TABLE 5

| (performance properties) | | | | | |
| --- | --- | --- | --- | --- | --- |
| | OFS | Haze | Slip | Edding | Oil |
| Sample without additive | 28.9 | 1 | — | 5 | 5 |
| Example 7 | 25.4 | 1 | 76% | 1 | 1 |
| Example 11 | 24.5 | 1 | 73% | 1 | 2 |
| Comparative example 2 | 25.8 | 1 | 75% | 1 | 1 |
| Comparative example 6 | 24.8 | 1 | 77% | 1 | 1 |
| Comparative example 7 | 24.5 | 1 | 76% | 5 | 5 |

In the case of the surface tension, haze, and reduction in slip resistance, the properties obtained are similar to those obtained with the additized comparative products. Moreover, the varnishes additized with the examples typifying the invention exhibit a distinct improvement in the dirt and oil repellency properties.

Intercoat Adhesion and Recoatability:

To determine the intercoat adhesion, the samples are applied to a primed steel sheet in a wet film thickness of 150 μm, using a four-way bar coater, and are baked in a gradient oven at 140, 170, 200, and 230° C. respectively. Thereafter a further coat of the respective sample is applied, and curing takes place in a forced-air oven at 140° C. Subsequently, for each temperature range, a DIN 53151 cross-cut test is performed. The intercoat adhesion is evaluated on the basis of ratings (rating 1-5, 1 corresponding to very good intercoat adhesion, 5 corresponding to poor intercoat adhesion).

The results obtained are set out in the following table:

| | 140° C. | 170° C. | 200° C. | 230° C. |
| --- | --- | --- | --- | --- |
| Sample without additive | 1 | 1 | 1 | 5 |
| Example 7 | 1 | 1 | 1 | 1 |
| Example 11 | 1 | 1 | 3 | 5 |
| Comparative example 2 | 1 | 2 | 5 | 5 |
| Comparative example 6 | 1 | 5 | 5 | 5 |
| Comparative example 7 | 3 | 5 | 5 | 5 |

The results obtained show that the inventive examples ensure better intercoat adhesion and recoatability.

Contact Angle:

The contact angle with water was measured as the advancing contact angle using the Krüss G2 contact angle measuring instrument. 8 μl were used for preliminary metering, and from 8 μl-12 μl 10 contact angles were determined on each drop side. The value reported is the average of the measurements.

| | Contact angle |
| --- | --- |
| Sample without additive | 89 |
| Example 7 | 103 |
| Example 11 | 102 |

The results obtained show that the additization leads to hydrophobization of the surface.

Overall, the systems according to the invention display an outstanding balance between dirt repellence on the one hand and recoatability on the other. At the same time, other important properties, such as good flow and low slip resistance, are fully maintained.

The invention claimed is:

1. A composition comprising a thermally curing coating material and polysiloxane-polyoxazoline copolymers or a thermally curing molding compound composition and polysiloxane-polyoxazoline copolymers, wherein the polysiloxane-polyoxazoline copolymers comprise polysiloxane blocks which consist of the following structural formula (II)

$$A \begin{bmatrix} R_1 \\ | \\ Si-O \\ | \\ R_2 \end{bmatrix}_o \begin{bmatrix} R_1 \\ | \\ Si-O \\ | \\ B \end{bmatrix}_p \begin{bmatrix} R_5 \\ | \\ Si-C \\ | \\ R_6 \end{bmatrix} \quad (II)$$

where o is 5 to 200 and p is 5 to 200;

$R_1$ and $R_2$ independently of one another are saturated linear alkyl radicals having 1 to 6 carbon atoms, saturated branched alkyl radicals having 3 to 6 carbon atoms, saturated cyclic alkyl radicals having 4 to 6 carbon atoms, linear alkenyl radicals having 2 to 6 carbon atoms, branched alkenyl radicals having 3 to 6 carbon atoms, cyclic alkenyl radicals having 4 to 6 carbon atoms, aryl radicals, alkylaryl radicals or arylalkyl radicals having 6 to 12 carbon atoms, the radicals being optionally halogen-substituted;

$R_5$ and $R_6$ independently of one another are $R_1$ or $R_2$ or are $R_4[SiR_1R_2O]_q$, in which q is 1 to 400 and $R_4$ is a saturated linear alkyl radical having 1 to 30 carbon atoms; a branched alkyl radical having 3 to 30 carbon atoms; a cyclic alkyl radical having 4 to 30 carbon atoms; or an aryl radical, an alkylaryl radical, or an arylalkyl radical having 6 to 30 carbon atoms, the radicals being optionally halogen-substituted;

A and C independently of one another are B or $R_4$, and

B is a linear or branched alkyl or aralkyl radical or a linker having a linear or branched alkylene or aralkylene structure which may comprise nitrogen and oxygen atoms, with the proviso that there is at least one such linker per siloxane block (II), wherein the linker is an amino-functional linker $(CH_2)_t$—$R_{10}$—$R_{11}$—$R_{12}$—$NR_{14}$—, where t is 2 to 30;

$R_{10}$ is $(CH_2)_u$, O, S, $NR_{14}$ or $C_6(R_{15})_4$, where u is 0 or 1 and $R_{14}$ is hydrogen, a saturated linear alkyl radical having 1 to 6 carbon atoms, a saturated branched alkyl radical having 3 to 6 carbon atoms, an aryl radical, an alkylaryl radical or an arylalkyl radical having 6 to 9 carbon atoms, and $R_{15}$ is hydrogen, or an alkyl radical having 1 to 6 carbon atoms:

$R_{11}$ is $(CH_2)_v$ or $(CH_2CHR_{16}O)_w$, where v is 0 to 30 and w is 0 to 50 and $R_{16}$ is hydrogen, a saturated linear alkyl radical having 1 to 6 carbon atoms, a saturated branched alkyl radical having 3 to 6 carbon atoms, or a saturated cyclic alkyl radical having 4 to 6 carbon atoms; and $R_{12}$ is $(CH_2)_x$, in which x is 0 to 3:

wherein the composition comprises 0.005 to 5 wt % of the polysiloxane-polyoxazoline copolymers, based on the overall composition comprising the coating material and the polysiloxane-polyoxazoline copolymers or the overall composition comprising the molding compound composition and the polysiloxane-polyoxazoline copolymers, wherein the composition when cured exhibits at least one of high scratch resistance, low slip resistance, substantially reduced emergence of the polysiloxane-polyoxazoline copolymers from the cured composition, and effective dirt repellence in conjunction with effective recoatability; and wherein the composition cures at temperatures above 100° C. to about 400° C.

2. The composition of claim 1, wherein the linker is $(CH_2)_3$—NH—.

3. The composition of claim 1, wherein the coating material comprises at least one of polyurethane, polyester, polyesterpolyol, polyacrylate, polymethacrylate, mixed poly(meth)acrylate, polyesteracrylate, epoxy, phenol/formaldehyde, poly(amide-imide) and alkyd resins as binders; and at least one of amino resins, monomeric and polymeric polyisocyanates and hydroxyalkylamides as crosslinking agents.

4. The composition of claim 1, wherein the molding compound comprises at least one of unsaturated polyester resins, vinyl resins, polyurethane resins, polyamide resins, phenol/formaldehyde resins and epoxy resins.

5. The composition of claim 4, wherein the molding compound comprises at least one of unsaturated polyester resins and/or vinyl resins and the composition further comprises at least one of polystyrene, polyvinyl acetate, polymethyl methacrylate and styrene/butadiene copolymers.

6. A coated substrate comprising the composition of claim 1.

7. A composition comprising a thermally curing coating material and polysiloxane-polyoxazoline copolymers or a thermally curing molding compound composition and polysiloxane-polyoxazoline copolymers, wherein the polysiloxane-polyoxazoline copolymers comprise polysiloxane blocks which consist of the following structural formula (II)

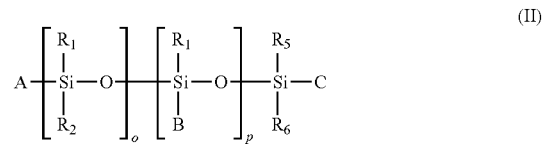

where
o is 5 to 200 and p is 5 to 200;

$R_1$ and $R_2$ independently of one another are saturated linear alkyl radicals having 1 to 6 carbon atoms, saturated branched alkyl radicals having 3 to 6 carbon atoms, saturated cyclic alkyl radicals having 4 to 6 carbon atoms, linear alkenyl radicals having 2 to 6 carbon atoms, branched alkenyl radicals having 3 to 6 carbon atoms, cyclic alkenyl radicals having 4 to 6 carbon atoms, aryl radicals, alkylaryl radicals or arylalkyl radicals having 6 to 12 carbon atoms, the radicals being optionally halogen-substituted;

$R_5$ and $R_6$ independently of one another are $R_1$ or $R_2$ or are $R_4[SiR_1R_2O]_q$, in which q is 1 to 400 and $R_4$ is a saturated linear alkyl radical having 1 to 30 carbon atoms; a branched alkyl radical having 3 to 30 carbon atoms; a cyclic alkyl radical having 4 to 30 carbon atoms; or an aryl radical, an alkylaryl radical, or an arylalkyl radical having 6 to 30 carbon atoms, the radicals being optionally halogen-substituted;

A and C independently of one another are B or $R_4$, and

B is a linear or branched alkyl or aralkyl radical or a linker having a linear or branched alkylene or aralkylene structure which may comprise nitrogen and oxygen atoms, with the proviso that there is at least one such linker per siloxane block (II), wherein the linker is an amino-functional linker $(CH_2)_t$—$R_{10}$—$R_{11}$—$R_{12}$—$NR_{14}$—, where t is 2 to 30;

$R_{10}$ is $(CH_2)_u$, O, S, $NR_{14}$ or $C_6(R_{15})_4$, where u is 0 or 1 and $R_{14}$ is hydrogen, a saturated linear alkyl radical having 1 to 6 carbon atoms, a saturated branched alkyl radical having 3 to 6 carbon atoms, an aryl radical, an alkylaryl radical or an arylalkyl radical having 6 to 9 carbon atoms, and $R_{15}$ is hydrogen, or an alkyl radical having 1 to 6 carbon atoms;

$R_{11}$ is $(CH_2)_v$ or $(CH_2CHR_{16}O)_w$, where v is 0 to 30 and w is 0 to 50 and $R_{16}$ is hydrogen, a saturated linear alkyl radical having 1 to 6 carbon atoms, a saturated branched alkyl radical having 3 to 6 carbon atoms, or a saturated cyclic alkyl radical having 4 to 6 carbon atoms; and $R_{12}$ is $(CH_2)_x$, in which x is 0 to 3:

wherein the composition comprises 0.005 to 5 wt % of the polysiloxane-polyoxazoline copolymers, based on the overall composition comprising the coating material and the polysiloxane-polyoxazoline copolymers or the overall composition comprising the molding compound composition and the polysiloxane-polyoxazoline copolymers, wherein the composition cures at temperatures from above 100° C. to about 400° C.

* * * * *